Nov. 4, 1947.  R. G. PIETY  2,430,246
AUTOMATIC VOLUME CONTROL FOR SEISMOGRAPH AMPLIFIERS
Filed July 25, 1944  2 Sheets-Sheet 2
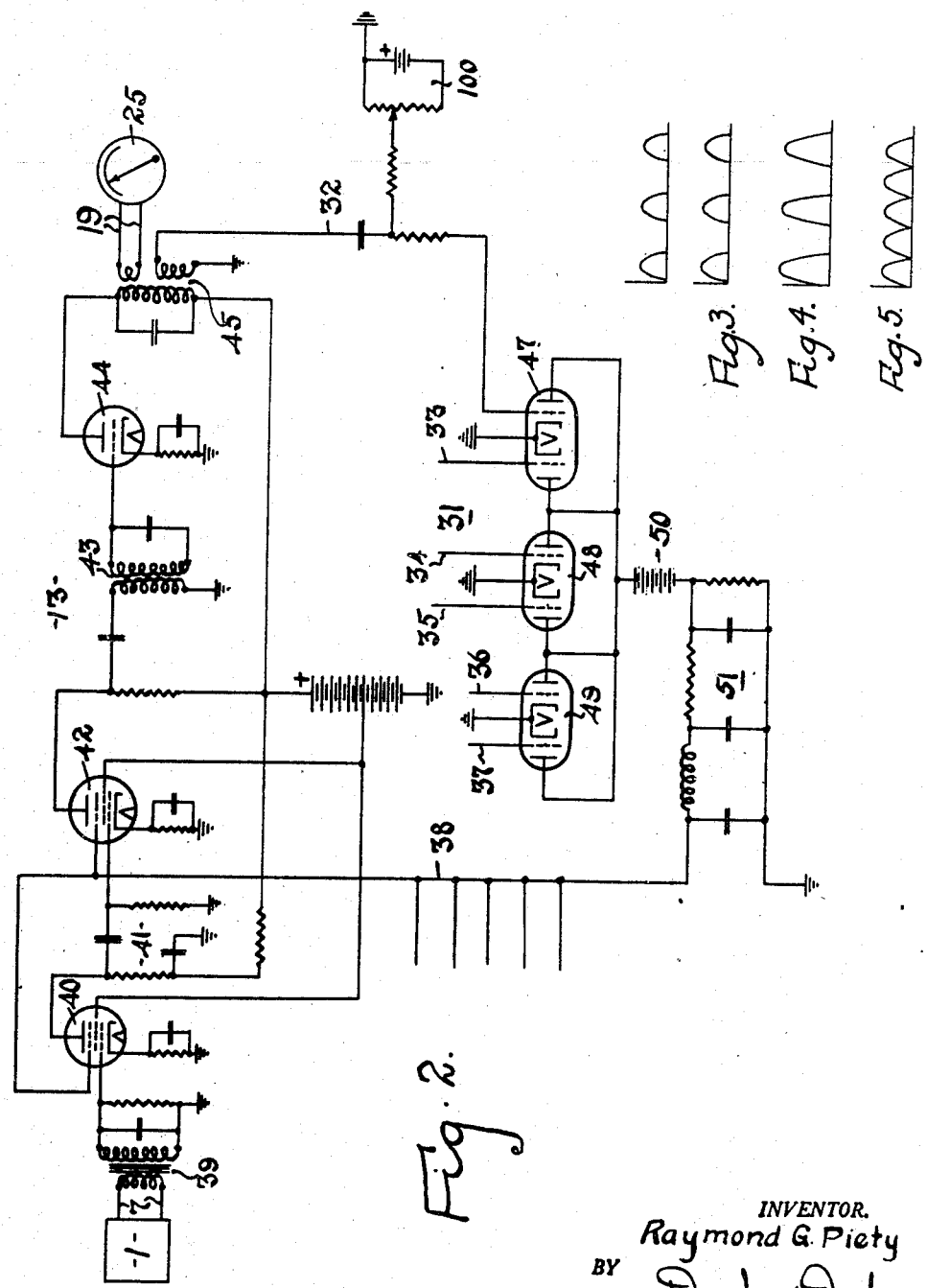
INVENTOR.
Raymond G. Piety
BY Danby + Danby.
Att'ys Patented Nov. 4, 1947

2,430,246

UNITED STATES PATENT OFFICE 2,430,246

AUTOMATIC VOLUME CONTROL FOR SEISMOGRAPH AMPLIFIERS

Raymond G. Piety, Yonkers, N. Y., assignor to Phillips Petroleum Company, a corporation of Delaware Application July 25, 1944, Serial No. 546,568

2 Claims. (Cl. 177—352)

This invention relates to a method and apparatus for controlling the amplification of a group of seismograph amplifiers to keep the amplitude of the output signals therefrom substantially constant.

An object of this invention is to provide an apparatus for obtaining a seismogram such that the record of each geophone or pick-up device is of constant amplitude so that weak reflections from deep strata and strong reflections from shallow strata will be converted into recording currents of confined amplitude so as to remain within the confines of the record on which they are recorded.

In accordance with this object, the amplifier gain is continuously adjusted so that it is inversely proportional to the average signal level while the wave forms of the currents representative of the reflections are preserved so that only the average signal level over an interval of time of suitable length is used to control the gain of the amplifiers.

In accordance with the usual method of operation of the reflection seismograph, a series of geophones are placed on the ground either singly or in groups over a distance varying from a few hundred feet to a few thousand feet. Each single or group of geophones is connected to an amplifier which actuates a galvanometer mirror or other recording device. In the case of the mirror galvanometer the mirror directs a light beam on to a record comprising a strip of sensitized photographic paper so that the movements of the light beam thereover are recorded. A charge of dynamite is set off in the ground to generate vibrational wave trains, which as they travel downward are reflected back to the surface of the earth by discontinuities in the layers of rock or other strata of varying density. Due to the hemispherical expansion of the wave trains and absorption in the ground the energy of the initial reflected wave trains may be ten thousand times stronger than the final wave trains which may have travelled through from two to four miles of ground. Obviously, it will be impossible to record such an intensity range on a sensitized photographic strip of limited size unless some means is provided to vary the gain of the amplifiers connected to the respective geophones to compensate for the varying signal strengths.

This variation in gain has been attained heretofore by a variety of methods each of which has one or more inherent disadvantages or troublesome characteristics. Most of these methods require skilled operators and, therefore, the results attained vary with the skill of the operators.

In order to eliminate the various objections to these systems, various automatic methods have been developed in which the output of the amplifier is rectified and filtered and then applied to control the gain of the amplifier individually. The possibility of this type of control arises from the observed fact that reflected energy is always present throughout the record. The interpretation of the record is based on the stronger reflections which persist from location to location over the territory surveyed. The continuously arriving reflected waves are of similar decay characteristics to the main reflections so that the rectified control voltage will correspond to the average reflected energy. This system controls the gain at each instant according to some function of the average energy preceding the reflection. This function decreases as the time preceding the instant under consideration increases. This mode of operation creates a difficulty at the very beginning of a record because the signal level goes from zero to a very high level. The amplifier requires some time to adjust itself and cut the gain to the required value. This leaves the first part of the record unsuitable for interpretations because of the large galvanometer deflections. If the adjustment time of the amplifier is reduced the system becomes oscillatory and, therefore, inoperative.

The method and apparatus of automatic volume control comprising the invention herein disclosed greatly reduces the tendency of the system to oscillate and also effects a considerable saving in the number of circuit elements required. Previous circuits for automatic volume control make each channel complete within itself. Sometimes a charged network is used in combination with automatic control in order to reduce the large amount of controlling energy required. In accordance with this invention the output of each amplifier channel is rectified, the rectified currents are added together, filtered, and the resultant voltage thereof is employed to control the gain of all the amplifiers simultaneously.

Other and more detailed objects of the invention will be apparent from the following description of one embodiment thereof when taken in connection with the attached drawings.

This invention resides substantially in the combination, construction, arrangement, relative location of parts, steps and series of steps as will be described in detail below.

In the accompanying drawings:

Figure 2 is a similar but more detailed circuit illustration of one channel illustrating the production of a control current which is the result of control currents taken from each of the amplifying channels;

Figure 3 is a diagrammatic illustration of the rectified current pulses of any two adjacent amplifiers;

Figure 4 shows the pulses produced by combining the current pulses of Figure 3 without phase reversal; and Figure 5 shows the result of the combination of the current pulses of Figure 3 with phase reversal as proposed herein.

Figure 1:
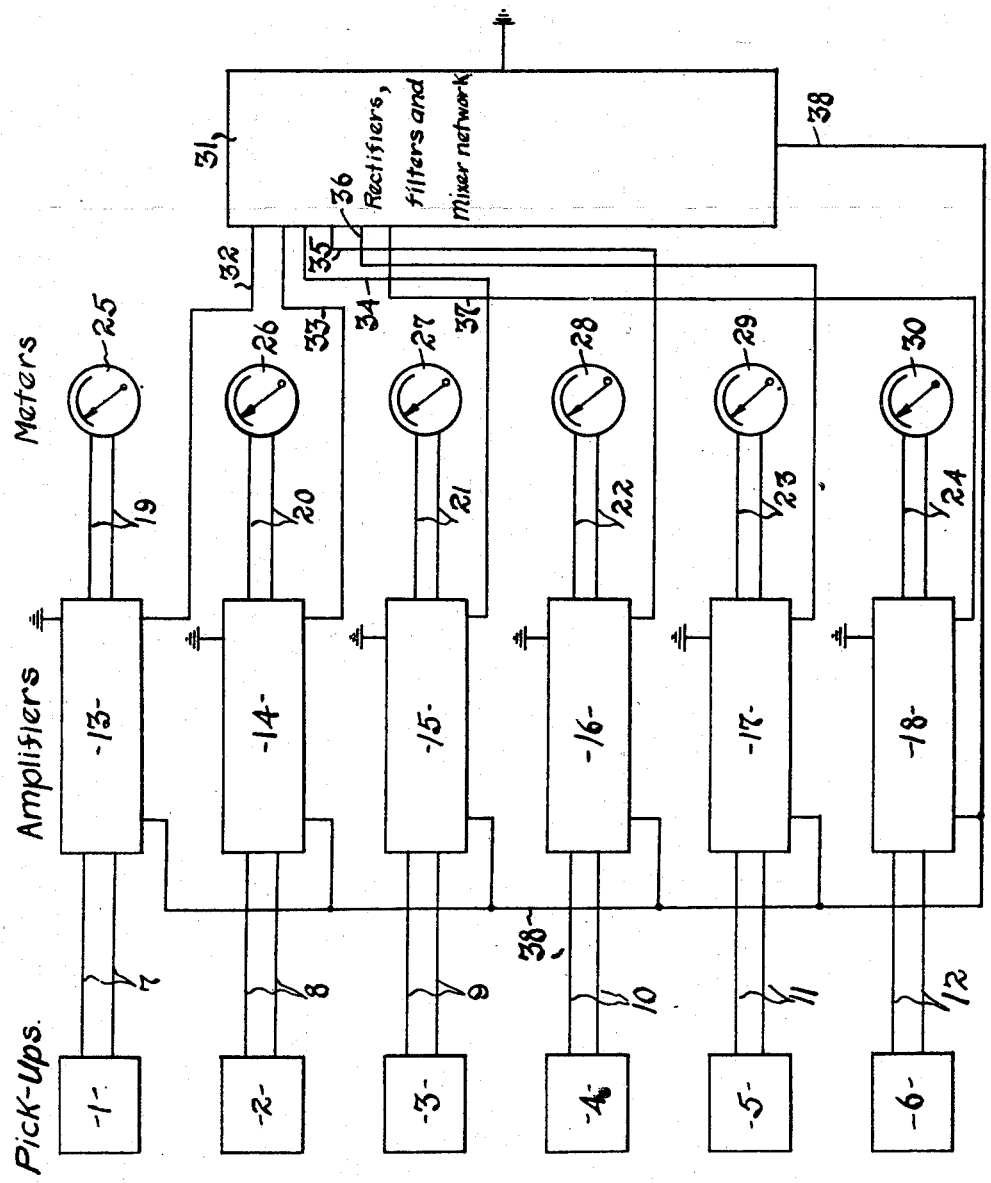
Figure 1 is a schematic and diagrammatic illustration of an apparatus combination in accordance with this invention.

Referring now to Figure 1 of the drawings, there is schematically illustrated one set-up of apparatus in accordance with this invention. The geophones or pick-up devices for translating earth tremors generated by an explosive charge are illustrated at 1, 2, 3, 4, 5 and 6. Devices of this type are well known and, therefore, the construction details thereof are not illustrated. The geophones are arranged with respect to each other and the point of detonation of the explosive charge in accordance with well known practices in seismographic surveying and may be connected to feed separate amplifier channels, as shown, or, when conditions dictate, several geophones may be connected to the input of a single amplifier channel. The pick-up devices are respectively connected by the circuit wires 7, 8, 9, 10, 11 and 12 to the inputs of amplifiers 13, 14, 15, 16, 17 and 18. The outputs of these amplifiers are respectively connected by means of the circuit wires 19, 20, 21, 22, 23 and 24 to the indicating devices 25, 26, 27, 28, 29 and 30 which may be of any suitable form of volt meter or, as is commonly the case, mirror type galvanometers. Each of the amplifiers is grounded, as shown, in accordance with common practice and a portion of the output current of each is supplied through the connections 32, 33, 34, 35, 36 and 37 to the unit 31 comprising a diagrammatic illustration of a multiple rectifier and common filter and mixing network as will be described in greater detail later. This unit is grounded as shown. The output of this unit is supplied by means of the wire 38 and branch connections, as shown, to each of the amplifier channels in a manner which will now be described.

Referring to Figure 2, one of the amplifier channels has been shown in sufficient detail for a full understanding of the invention connected to a rectifier, the output of which is applied to a filter whose output in turn is applied to the amplifier channel. Thus the geophone 1 is shown connected by the wires 7 to the primary of the input transformer 39, the secondary of which is connected between ground and the control electrode of a pentode 40. The output circuit of this pentode is connected through a suitable coupling circuit 41, resistance coupling in this case, to the control grid of a pentode 42. The output circuit of pentode 42 is coupled through the transformer 43 to the input of the triode vacuum tube 44. The output of this triode is coupled through a three-coil transformer 45 to the indicating or measuring device 25, as shown. The other secondary of transformer 45 is connected through a suitable coupling circuit by means of the wire 32 to the control grid of a triode rectifier 47. One suitable form of biasing circuit 100 is provided for controlling the operation of the rectifying triode. In the arrangement illustrated employing these pick-up devices, there are six triode rectifiers arranged in the form of dual triodes 47, 48 and 49. The control grids of the respective rectifiers are connected by the wires 33, 34, 35, 36 and 37 to the outputs of the respective amplifier channels 14, 15, 16, 17 and 18 in the same manner as in the case of channel 13 illustrated in detail in Figure 2. The output circuits of the triode rectifiers are combined as shown and connected to a grounded filter and mixing circuit 51 of any suitable design. One of the output terminals of the circuit 51 is grounded, as shown, and the other terminal is connected by the wire 38 to the suppressor grids of each of the pentodes 40 and 42. Suitable grounding connections, capacitor connections, battery supplies, by-pass condensers, resistors, etc., are illustrated as forming a necessary part of circuits of this type but in themselves comprising no specific novelty and hence not described in detail. Those skilled in the electronic art can reproduce the subject matter of this invention in the light of the disclosure as given.

In the usual automatic volume control circuit each of the channels is connected to its own rectifier and filter system as distinguished from the invention herein disclosed in which the outputs of all of the rectifiers for all of the channels are fed to and combined in a single filter the combined output current of which simultaneously controls the gain of all of the channels. When the conventional circuit is used the rectifier output must be six times, in the case of the example illustrated, the output of any single amplifier of the group. This greater gain around the loop consisting of amplifier, rectifier, filter and back to the amplifier makes it difficult to control the output because of the tendency of self-oscillation at high control levels. For seismograph control it is desirable to reduce a thousand to one variation of input signal to about two to one or less variations on the output and this must be done without altering the wave form of the individual wave trains except for their magnitude. There are two ways in which self-oscillation may be set up in the usual type of volume control system. The system will either oscillate without any applied voltage or alternately oscillation may only take place when a signal is applied. In the latter case, the condition for oscillation depends upon the phase shift on the modulated envelope and rectifier-filter plus the gain around the loop. Usually the first mentioned mode of oscillation is the more difficult to eliminate. By adding the output of all the rectifiers together several advantages are simultaneously obtained. First, there is the reduction in individual loop gain just mentioned. Second, due to the fact that each channel is amplifying a signal of different wave form but comparable amplitude, the combined output requires less filtering to smooth out the D. C. control voltage. The reduction in filtering requirements is substantial and as a consequence the phase shift and consequent tendency to self-oscillation is reduced. Third, by alternately reversing the phase of the secondary of transformer 45, it is possible to reduce the tendency to oscillate as a complete unit where all amplifiers are considered to be in parallel; alternately the phases of transformers 39 and 43 may be inverted so that the phase around the loop is changed but not the phase through input to the output of the amplifier itself.

The illustrations of Figures 3, 4 and 5 are for sinusoidal waves. Seismic disturbances are wavelike pulses of greater complexity and phase reversal yields an even greater advantage. Since the pulses do not appear in each channel at exactly the same time a further advantage is obtained when connections are made at 34, 35, 36 and 37. The greater the number of channels the greater is the advantage of phase reversal.

This invention is not limited to the particular circuit illustrated where the controlling voltage from the filter is applied to the second grid of the amplifier tubes. The controlling voltage may be applied to any type of element capable of modulating the applied signal. This type of circuit is of particular advantage where the elimination of the extra components of individual channel control increases the simplicity and portability of the equipment.

From the above description, it will be apparent to those skilled in this art that the subject matter of this invention is capable of detail variation while employing the novel subject matter of this invention. I do not, therefore, desire to be limited by the illustrative embodiment of this disclosure but rather by the scope of the claims granted me.

What is claimed is:

1. In a seismograph recording system, the combination comprising a plurality of low frequency amplifiers, a plurality of geophones providing low frequency signal sources connected to the inputs of said amplifiers respectively, means for individually rectifying the output currents of said amplifiers, means for connecting the output circuits of alternate amplifiers in reverse phase to said rectifying means respectively, whereby the tendency of the system to oscillate is minimized, means for combining the rectified output currents of said rectifiers, means for applying the combined rectified current to all of the amplifiers simultaneously to control the gain thereof, and means coupled to the output of each amplifier for individually indicating the magnitude of the output voltages representative of the applied signals.

2. In a seismic prospecting system of the type described, the combination comprising a plurality of low frequency vacuum tube amplifiers, each comprising a plurality of multi-electrode vacuum tubes having coupled input and output circuits, independent geophones as signal sources for applying signal currents to each of said amplifiers, a plurality of independent rectifiers connected to the output circuits of said amplifiers respectively with each alternate rectifier output reversed in phase whereby the tendency of the circuit to oscillate is minimized, a single mixing and filtering circuit connected to the output circuits of all of said rectifiers, a connection from the output of said mixing and filtering circuit to an input circuit of each of said amplifiers to control the gain thereof, and voltage indicating meters respectively, energized by said amplifiers to indicate the relative strength of the applied signals.

RAYMOND G. PIETY.

REFERENCES CITED

The following references are of record in the file of this patent:

UNITED STATES PATENTS

| Number | Name | Date |
| --- | --- | --- |
| 2,226,366 | Braden | Dec. 24, 1940 |
| Re. 22,535 | Shimek | Aug. 22, 1944 |
| 2,301,739 | Minton et al. | Nov. 10, 1942 |
| 2,281,949 | Ritzmann | May 5, 1942 |
| 2,349,186 | Merten | May 16, 1944 |
| 2,312,934 | Shook | Mar. 2, 1943 |
| 2,364,755 | Ritzmann | Dec. 12, 1944 |
| 2,374,204 | Hoover | Apr. 24, 1945 |